Patented Mar. 7, 1933

1,900,616

UNITED STATES PATENT OFFICE

ADOLFO POUCHAIN, OF TURIN, ITALY

ELECTRIC ACCUMULATOR

No Drawing. Application filed May 1, 1928, Serial No. 274,363, and in Germany May 19, 1927.

This invention relates to electric accumulators of zinc-lead type.

It is known that during the charge of a zinc-lead accumulator, in proportion with zinc being deposited on the negative electrode free sulphuric acid is evolved which remains dissolved in the electrolyte, the acidity of this latter being thus increased owing to the amount of free sulphuric acid it takes up. As far as the positive electrode is concerned, during the charge, a portion of lead sulphate it contains is converted into lead oxide and acid is evolved which adds to the acidity of the electrolyte. On the contrary, during the discharge, in proportion with the deposited zinc being dissolved again on becoming converted into zinc sulphate and a portion of lead oxide being again converted into lead sulphate, an amount of sulphuric acid contained in the electrolyte at the end of the charge is substracted from the electrolyte.

It is also known that the amount of metallic zinc which is deposited when a current of one ampere is caused to pass through an acid electrolyte containing zinc sulphate, varies in proportion with the amount of free acid contained in the electrolyte; that is to say the efficiency is modified.

Up to the present time, no rule has been suggested for determining the acidity values of the electrolyte, and such acidity, apart from variations it undergoes during the accumulator operations, has arbitrary and variable values in accordance with the composition of the electrolyte, conditions of the electrode, and amount of the electrolyte contained in the accumulator tank.

This invention is directed to a zinc-lead accumulator in which the best operative conditions in respect to both the character of electrolytic deposit of zinc and the reduction in time required for operation are obtained.

This invention, consists primarily in maintaining the acidity of the electrolyte, during the operation, confined between 80 and 280 grammes of free sulphuric acid for each litre of electrolyte.

Such a result may be secured, by way of example, by giving to the electrolyte, at the beginning of the charge, the approximate following composition:—

| | |
|---|---|
| Water | 1000 c. c. |
| $H_2SO_4$ | 80–150 grams |
| $ZnSO_4$ | 450–650 grams |
| Additions | 15– 30 grams |

(said additions including substances, like aluminum sulphate, mercury sulphate, sodium sulphate, potassium sulphate or boric acid, having a catalytic action in the operation of the accumulator) and using positive electrodes in entirely peroxidized conditions.

When positive electrodes are used which are not entirely peroxidized, the composition must be modified to reduce the amount of free sulphuric acid contained in the electrolyte at the beginning of the operation.

In any case it is essential that at least 800 c. c. of liquid are used for each 75 ampere-hours of supplied energy, that is assuming to take into consideration an accumulator whose capacity is 75 ampere-hours, when 800 c. c. of the above stated initial liquid are used, the acidity is maintained within the ranges referred to and the charge and discharge of the accumulator correctly take place under the best conditions. In an accumulator having a smaller capacity, a proportionately reduced amount of the same liquid is used, while in an accumulator having a larger capacity, a proportionately larger amount of liquid is used. During the charge the composition of the electrolyte becomes progressively altered, the content of free acid increasing until it contains about 23–28% of free sulphuric acid at the end of the charge.

During the discharge the content of free acid is decreasing and at the end of the discharge the electrolyte contains an amount of free sulphuric acid between 8 and 12 per cent.

Therefore by using the above stated initial composition for the electrolyte a good efficiency is secured during the charge and the discharge is produced in the required conditions as to rapidity and uniformity.

What I claim as my invention and desire to secure by United States Letters Patent is:—

A zinc-lead electric accumulator, comprising lead electrodes, electrodes for deposition of zinc thereon, and an electrolyte formed of an aqueous solution, containing 80–150 grams of free $H_2SO_4$ and 450–650 grams $ZnSO_4$ for about 1,000 cc. of water at the beginning of an accumulator charge after a complete discharge, the amount of said electrolyte in the accumulator being at least 800 cc. for each 75 ampere-hours of accumulator capacity.

In testimony whereof I have signed my name to this specification.

ADOLFO POUCHAIN.